(12) United States Patent
Aschpurwis

(10) Patent No.: US 11,740,640 B2
(45) Date of Patent: Aug. 29, 2023

(54) METHOD FOR MOVING A DRIVERLESS TRANSPORT VEHICLE ON AN INCLINED TRANSPORT ROADWAY

(71) Applicant: SIEMENS LOGISTICS GMBH, Nuremberg (DE)

(72) Inventor: Carsten Aschpurwis, Constance (DE)

(73) Assignee: Siemens Logistics GmbH, Nuremberg (DE)

( * ) Notice: Subject to any disclaimer, the term of this patent is extended or adjusted under 35 U.S.C. 154(b) by 316 days.

(21) Appl. No.: 17/279,362

(22) PCT Filed: Sep. 6, 2019

(86) PCT No.: PCT/EP2019/073858
§ 371 (c)(1),
(2) Date: Mar. 24, 2021

(87) PCT Pub. No.: WO2020/064305
PCT Pub. Date: Apr. 2, 2020

(65) Prior Publication Data
US 2021/0397200 A1 Dec. 23, 2021

(30) Foreign Application Priority Data
Sep. 26, 2018 (EP) ...................... 8196890

(51) Int. Cl.
*G01C 22/00* (2006.01)
*G05D 3/00* (2006.01)
(Continued)

(52) U.S. Cl.
CPC ........... *G05D 1/0287* (2013.01); *B60W 10/20* (2013.01); *B60W 40/076* (2013.01);
(Continued)

(58) Field of Classification Search
CPC ........ G05D 1/0287; G05D 2201/0216; B60W 10/20; B60W 40/076; B60W 40/105;
(Continued)

(56) References Cited

U.S. PATENT DOCUMENTS

2005/0038590 A1* 2/2005 Jung ..................... F02D 41/021
701/93
2012/0220422 A1* 8/2012 Wurthner .............. B60W 10/06
477/79
(Continued)

FOREIGN PATENT DOCUMENTS

CN 104155975 A 11/2014
CN 204369132 U 6/2015
(Continued)

OTHER PUBLICATIONS

Damion Dunlap et al., "Motion planning for steep hill climbing", Robotics and Automation (ICRA), 2011 IEEE International Conference ON, IEEE,May 9, 2011 (May 9, 2011), pp. 707-714, XP032033583, DOI: 10.1109/ICRA.2011.5979709 external link, ISBN: 9781612843865, p. 1, left column, paragraph1; Expectations Illustrations; p. 1, right column, paragraph 3; p. 6, right column, paragraph 2; Illustrations.

*Primary Examiner* — Harry Y Oh
(74) *Attorney, Agent, or Firm* — Laurence A. Greenberg; Werner H. Stemer; Ralph E. Locher

(57) ABSTRACT

A higher throughput is an increasingly necessary requirement for driverless transport systems with a plurality of driverless transport vehicles. In arrangements with inclined roadways, resuming a movement is problematic in that doing so has hitherto only been possible with a limited arrangement of the roadways and/or with highly dimensioned drives. The novel method provides for moving a driverless transport vehicle on an inclined transport roadway, wherein the steering drives are actuated on the basis of
(Continued)

the detected inclination direction in order to move the vehicle such that the transport vehicle is moved transversely to the inclination direction. After a specified minimum speed of the transport vehicle transversely to the inclination direction is reached, the steering drives are adjusted such that the transport vehicle continues to move in the inclination direction.

12 Claims, 5 Drawing Sheets

(51) Int. Cl.
    *G05D 1/02*     (2020.01)
    *B60W 60/00*     (2020.01)
    *B60W 10/20*     (2006.01)
    *B60W 40/076*     (2012.01)
    *B60W 40/105*     (2012.01)

(52) U.S. Cl.
    CPC ...... *B60W 40/105* (2013.01); *B60W 60/0011* (2020.02); *B60W 60/00256* (2020.02); *B60W 2552/15* (2020.02); *G05D 2201/0216* (2013.01)

(58) Field of Classification Search
    CPC ....... B60W 60/0011; B60W 60/00256; B60W 2552/15; B66F 9/063; B62D 7/1509; G06Q 10/04; G06Q 10/06; G06Q 10/08; G06Q 50/28
    See application file for complete search history.

(56) References Cited

U.S. PATENT DOCUMENTS

| | | | |
|---|---|---|---|
| 2017/0327113 | A1* | 11/2017 | Yamakado ........ B60W 50/0097 |
| 2018/0037082 | A1 | 2/2018 | Unger et al. |
| 2018/0326987 | A1* | 11/2018 | Shine ................. B60W 50/087 |
| 2019/0381894 | A1* | 12/2019 | Kujubu ............... B60L 15/2018 |
| 2020/0164885 | A1* | 5/2020 | Kujubu .................... H02P 3/14 |

FOREIGN PATENT DOCUMENTS

| | | |
|---|---|---|
| CN | 1059058550 A | 8/2016 |
| CN | 106120673 A | 11/2016 |
| CN | 106476805 A | 3/2017 |
| CN | 107257748 A | 10/2017 |
| CN | 207046296 U | 2/2018 |
| JP | S60187206 A | 9/1985 |

* cited by examiner

METHOD FOR MOVING A DRIVERLESS TRANSPORT VEHICLE ON AN INCLINED TRANSPORT ROADWAY

BACKGROUND OF THE INVENTION

Field of the Invention

The present invention relates to a method for moving a driverless transport vehicle on an inclined transport roadway as claimed, to a use of the afore-cited method according, as claimed, and to a driverless transport system as claimed.

The field of sorting systems forms the basis of the invention. Sorting systems identify single piece goods which arrive in any order and are formed heterogeneously, for instance packages (in post offices), pieces of luggage (in airport terminals) or consignments (in mail order firms) on account of predetermined differentiation criteria and distribute the same to defined destinations. Such sorting systems consist of sorting installations which, with corresponding organizational processes and adjusted operating strategies, which are implemented in associated controllers in the sorting installations or sorting systems, ensure system functionality of the sorting systems.

Here the sorting installation represents the technical part of the sorting system and consists of one or more sorters, which realizes/realize the distribution of the item of piece goods to the destinations, as well as upstream and downstream functional areas, such as the conveying in and out of the item of piece goods.

Such a sorter itself consists of an infeed, a distributing conveyor and end/destination points for the item of piece goods to be distributed. Depending on the weight of the item of piece goods, sorters reach sorting capacities of items of piece goods in excess of 15,000 pieces per hour. Typical maximum weights of piece goods are approx. 20 kg to 60 kg, with individual sorting systems also up to 150 kg.

With a technology-oriented classification of distributing conveyors according to the criteria: occupancy type, operating principle of a discharge of the item of piece goods and conveyor-specific principle, it is possible to make a distinction between in particular distributing conveyors with a cross-belt or cross-band technology and a tilt-tray technology, in short cross-belt conveyor or cross-band sorter and tilt-tray conveyor.

A cross-belt conveyor or cross-band sorter is known from the source [4].

Instead of transport elements connected in a closed chain, driverless autonomous transport vehicles are employed increasingly, such as are known as DTV, AGV or as "mobile robots:"

DTV
Driverless transport vehicles,→source [2];
AGV
Automated guided vehicle,→source [1];
mobile robots
→source [3].

The afore-cited vehicles are summarized below with the term "driverless transport vehicles "DTV" or abbreviated to "DTV".

These driverless transport vehicles reach speeds of up to approx. 3 m/s in the afore-cited field of application. Under particular conditions, provision is also made for higher speeds for this DTV. The routing is carried out in a spatially adaptable, in most instances, horizontal manner. Instead of crossroads, what are known as overpasses are constructed, in order to enable operation to be as collision-free and jam-free as possible. In larger airport terminals, provision is made for a number of levels for the driverless transport vehicles. The afore-cited overpasses or a journey from one level to another level require a height difference of up to 5 m to be overcome, both upwards and downwards.

Even with a well thought out regulation of a plurality of such DTVs, it is not possible to rule out idling during operation. If such a DTV is on an inclined roadway section, this places significant demands on the power of the drive. For reasons of the vehicle's battery capacity and also on economic grounds, the power of the drive cannot just be increased, thereby ensuring the movement on the inclined roadway. Here a synchronous restart of a plurality of such DTVs is of particular importance.

The dimensioning of the drive of a driverless vehicle DTV requires a complex analysis. With the design of a vehicle which should also manage gradients (=inclined roadway sections) in both directions, different load states must be taken into account. This gives rise to situations which must be controlled:

The monitored safety area must correspond equally to the maximum permitted braking distance with loading, even on a downward gradient.

Kinematic requirements, which have to be controlled with the selected drive such as e.g. a minimum gradient with a nominal speed, a minimal acceleration.

This key data may produce a drive which fulfills the condition, but would reach its limits in individual situations, such as e.g. stopping on an inclined roadway section (stopping in a gradient) and restarting in the afore-cited roadway section.

FIG. 5 shows a flow chart for dimensioning a drive for a DTV for moving in a gradient.

The usual measures such as reducing the gradient, increasing the power reserve in the drive, reducing the payload are either impractical or associated with significant additional effort, which is economically not sustainable.

BRIEF SUMMARY OF THE INVENTION

The object underlying the present invention is therefore to specify a method for moving a driverless transport vehicle on an inclined transport roadway, without the drive having to be over-dimensioned and without a massive restriction having to be accepted for the layout of the roadways.

This object is achieved by the measures specified in the independent claims. Advantageous embodiments of the invention are specified in further claims.

The inventive method for moving a driverless transport vehicle DTV on an inclined transport roadway is based on a DTV, which has means for detecting the direction of inclination of the transport roadway relative to the transport vehicle, and which has controllable steering drives.

The inventive method is characterized by the method steps:

i) for moving purposes the steering drives are activated on account of the detected direction of inclination so that the transport vehicle moves in a direction which differs from the direction of inclination;

ii) after the driverless transport vehicle reaches a predetermined minimum speed, the steering drives are set so that the transport vehicle continues to move in the direction of inclination.

From this inventive method, the following advantages cited below may additionally result.

The movement in a direction of motion with a direction of motion angle relative to the direction of inclination can take place in two different ways, which can be freely selected according to the field of application:

i) A DTV does not need to change its orientation relative to the direction of inclination upon start-up, since the steering drives of a DTV can rotate from a starting position about at least ±90°. A larger turning range is not required, since this can be achieved with a change in direction of the drive wheels of the steering drives. After rotating the steering drives about the provided direction of motion angle relative to the direction of inclination and correspondingly applying a torque to the drive wheels, the DTV can therefore proceed without changing the orientation of the DTV, this then also subsequently applies to the transition of the travel to the direction of inclination.

ii) On account of the free adjustability of the steering drives, it is also possible, however, for the DTV, before moving, to rotate about a predetermined direction of motion angle relative to the direction of inclination. This rotation can be achieved by actuating the steering drives and their associated wheels as a virtual differential gear. This rotation can also be visualized with a tracked vehicle, the tracks of which are activated in the opposite direction. For this case, the driverless transport vehicles preferably have 4 supporting rollers at the corners (assuming a rectangular layout) and two steering drives arranged parallel in the center. By applying a torque to the drive wheels in the opposite direction, a corresponding direction of motion angle or this opposing application corresponds to the previously mentioned virtual differential gear.

When a minimum speed is reached, the DTV achieves a corresponding kinetic energy, so that a change in direction with respect to the direction of inclination can be introduced. As a result, the drive power for the movement in a gradient does not need to be increased. Each movement contains what are known as breakaway torques such as e.g. flexing work, temporary flattening of the platforms. As soon as these breakaway torques are overcome and a predetermined minimum speed is reached in a direction of motion angle relative to the direction of inclination, the drive elements are set so that the DTV continues to move in the direction of inclination. This change in direction transverse to the direction of inclination preferably takes place continuously. The predetermined minimum speed is preferably in the optimal speed range of the motors.

The afore-cited direction of motion angle relative to the direction of inclination preferably lies in a range of 90° to around 45°. A movement angle in the range 90° to around 110° makes perfect sense. The movement is facilitated since in this direction gravity additionally functions as an acceleration component. The afore-cited 90° to around 110° are equivalent to a rotation about −90° to around −70° associated with a change in direction of the drive wheels.

BRIEF DESCRIPTION OF THE SEVERAL VIEWS OF THE DRAWING

The invention is explained in greater detail below on the basis of the drawing, for example. In the drawings.

DETAILED DESCRIPTION OF THE INVENTION

Figure 1:
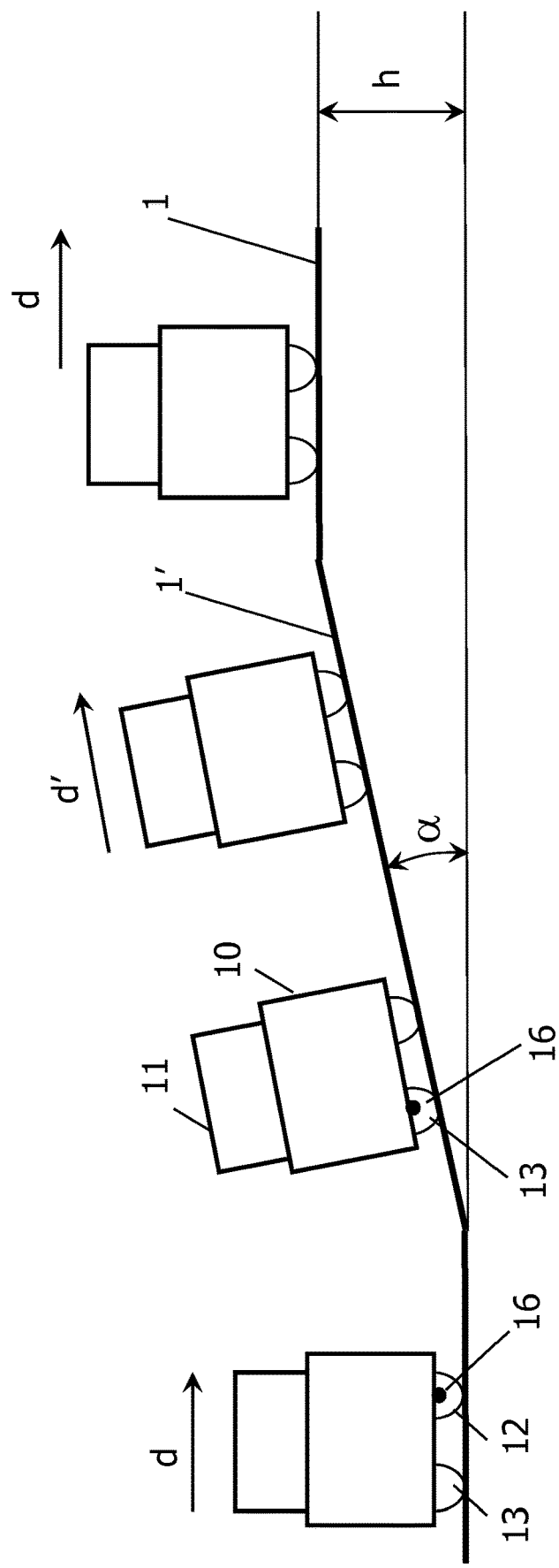
FIG. 1 shows a representation of a number of driverless vehicles along an inclined transport roadway.

FIG. 1 shows a representation of a number of driverless vehicles along a transport path with a suitable transport roadway section. The gradient of the inclined transport roadway section is defined by the angle of inclination or gradient angle α and the height h to be overcome for an overpass instead of a crossing or for the journey to another transport level. A typical value for the height h lies at approx. 5 mm and for the angle of inclination α in a range of approx. 8° to 20°. The plurality of the DTVs shown should also indicate that with a stop which is required during operation, it is not only a number of individual vehicles that have to be moved again on a gradient, but a plurality of DTVs must instead move synchronously over a larger transport roadway section 1, 1'. Without synchronous movement, there is a very significant reduction in the throughput of piece goods to be transported. This phenomenon is well-known in traffic in the case of what is known as congestion dissipation. FIG. 1 highlights the horizontal transport direction d and the inclined transport direction d'. The driverless transport vehicles 10 each carry an item of piece goods 11. These piece goods are generally of varying weights and sizes and are thus not of the same dimension, as could be taken from FIG. 1. Each transport vehicle 10 has steering drives 12 or drive wheels 12 and supporting rollers 13 with an axis of rotation 16 in each case. Steering drives 12 or drive wheels 12 and supporting rollers 13 can be rotated with respect to the transport vehicle 10 for the transport direction specification. A horizontal or inclined transport roadway is referred to with 1 or 1'.

Figure 2:
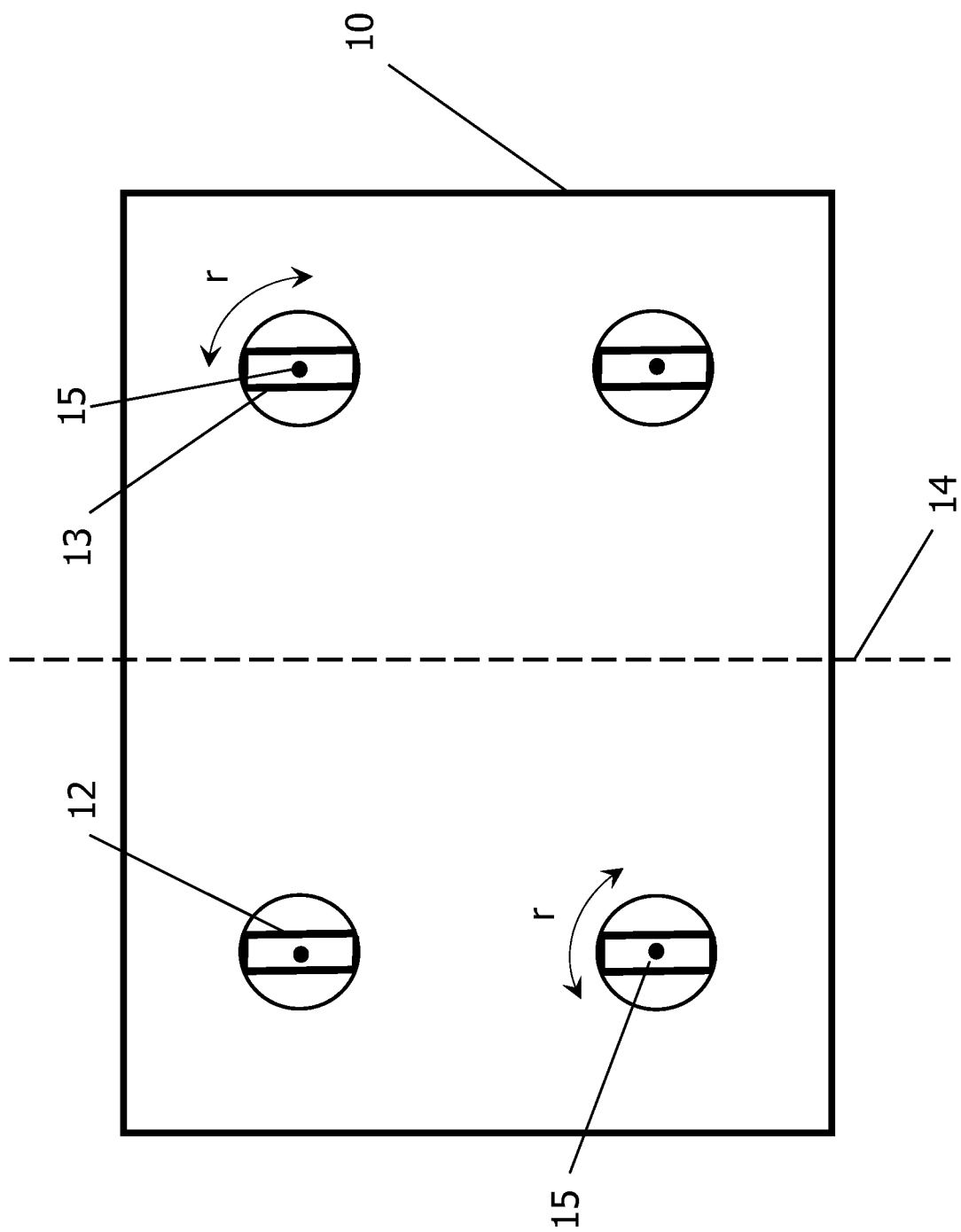
FIG. 2 shows an example for the disposal of drive elements and supporting rollers of a DTV for carrying out the method on an inclined transport roadway.

FIG. 2 shows the outline of a driverless transport vehicle 10 with steering drives 12 and supporting rollers 13. This arrangement is purely exemplary, in the source [2], further arrangements are shown, for instance four supporting rollers 13 at the corners of the DTV and two drive rollers 12 arranged opposite one another in the interior of the rectangular outline of a DVT.

Figure 3:
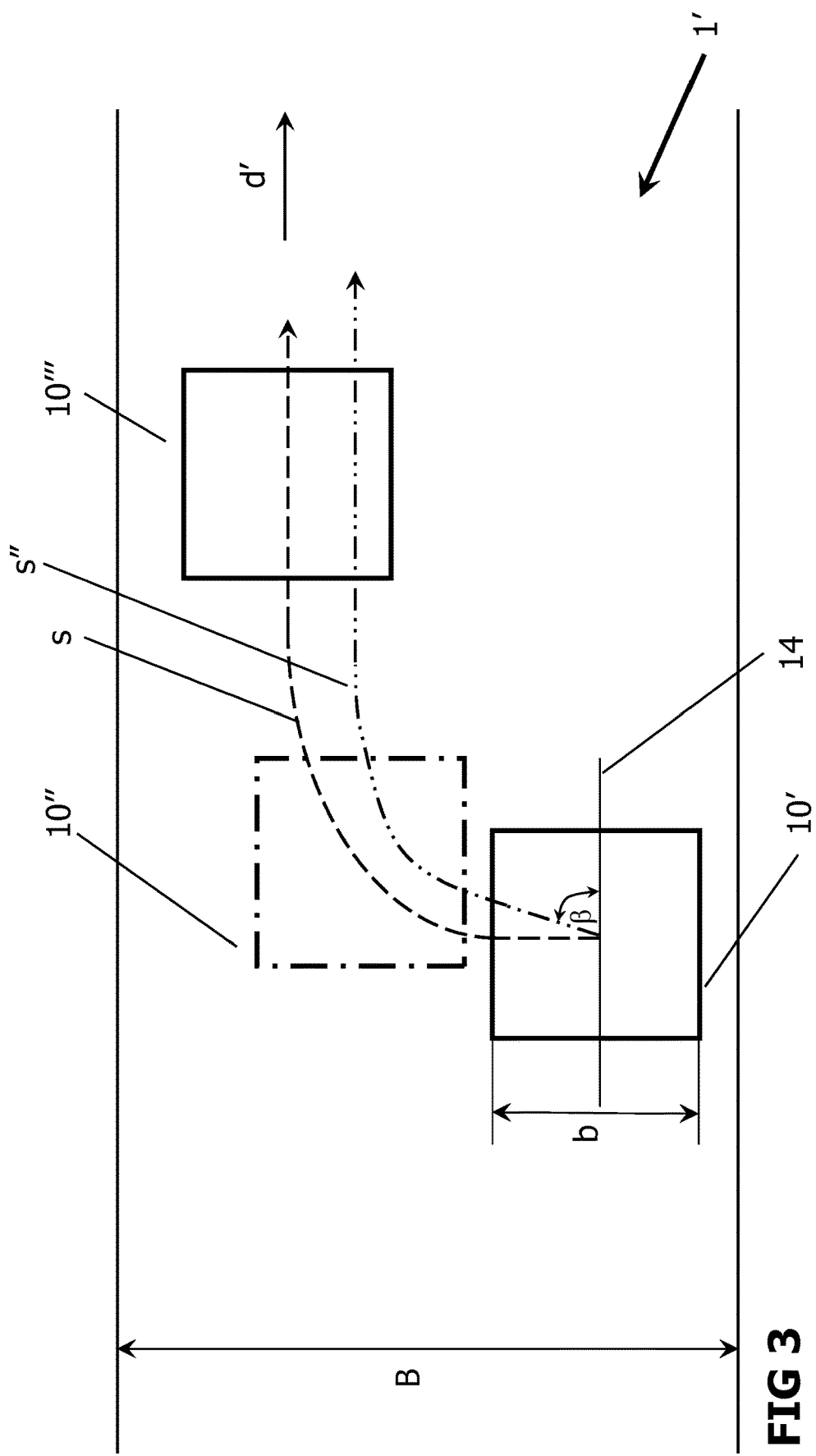
FIG. 3 shows a motion sequence for movement on an inclined transport roadway without changing the orientation of the driverless vehicles.

FIG. 3 shows the motion sequence for the movement on an inclined transport roadway path 1' without a significant change in the orientation of the DTV along a movement track s. The direction of motion angle β (not shown for the movement track s in FIG. 3) amounts to 90° according to the movement at right angles to the direction of inclination. The axis of motion 14 of the DTV essentially remains parallel to the direction of inclination d'. Essentially this means that this parallelism always remains constant in terms of dynamic effects. The roadway width is specified with the size B and the vehicle width with the size b.

It is assumed that a DTV must stop in the position 10'. The steering drives 12 are rotated about 90° for the movement and then the drive wheel is driven by a motor by means of a controller so that the DTV firstly moves at right angles to the direction of inclination d'. After reaching a predetermined minimum speed, at least the drive elements 12 are rotated so that the further movement of the DTV takes place into a position 10", the DTV navigates a bend s and when the direction d' is reached the drive elements are set so that the DTV continues to move in the direction d', cf. position 10'''. A movement track s'' is additionally shown purely by way of example in FIG. 3, in which the direction of motion angle β amounts to approx. 60°.

Figure 4:
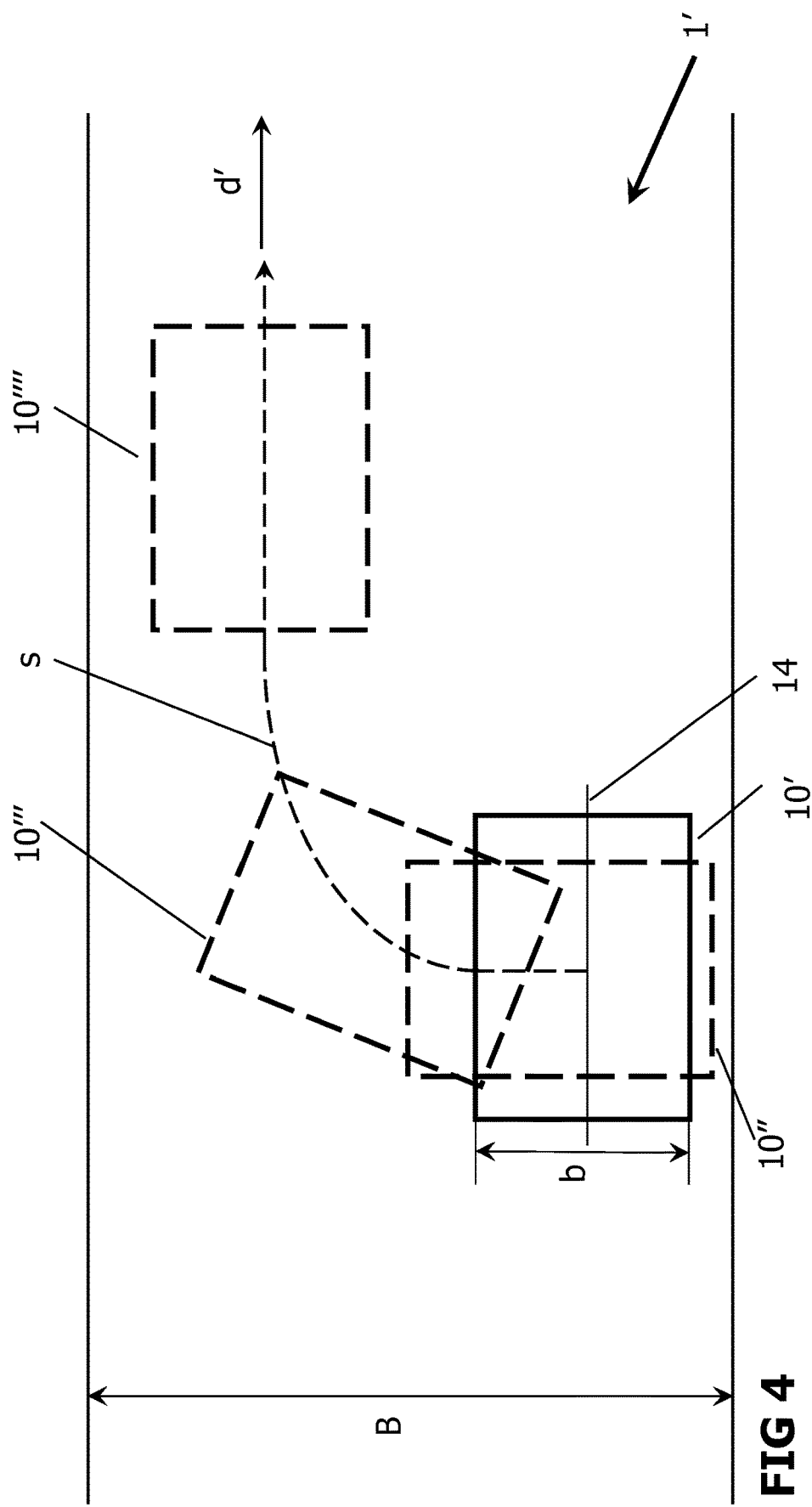
FIG. 4 shows a movement sequence for movement on an inclined transport roadway with a change in the orientation of the driverless vehicles.
Figure 5:
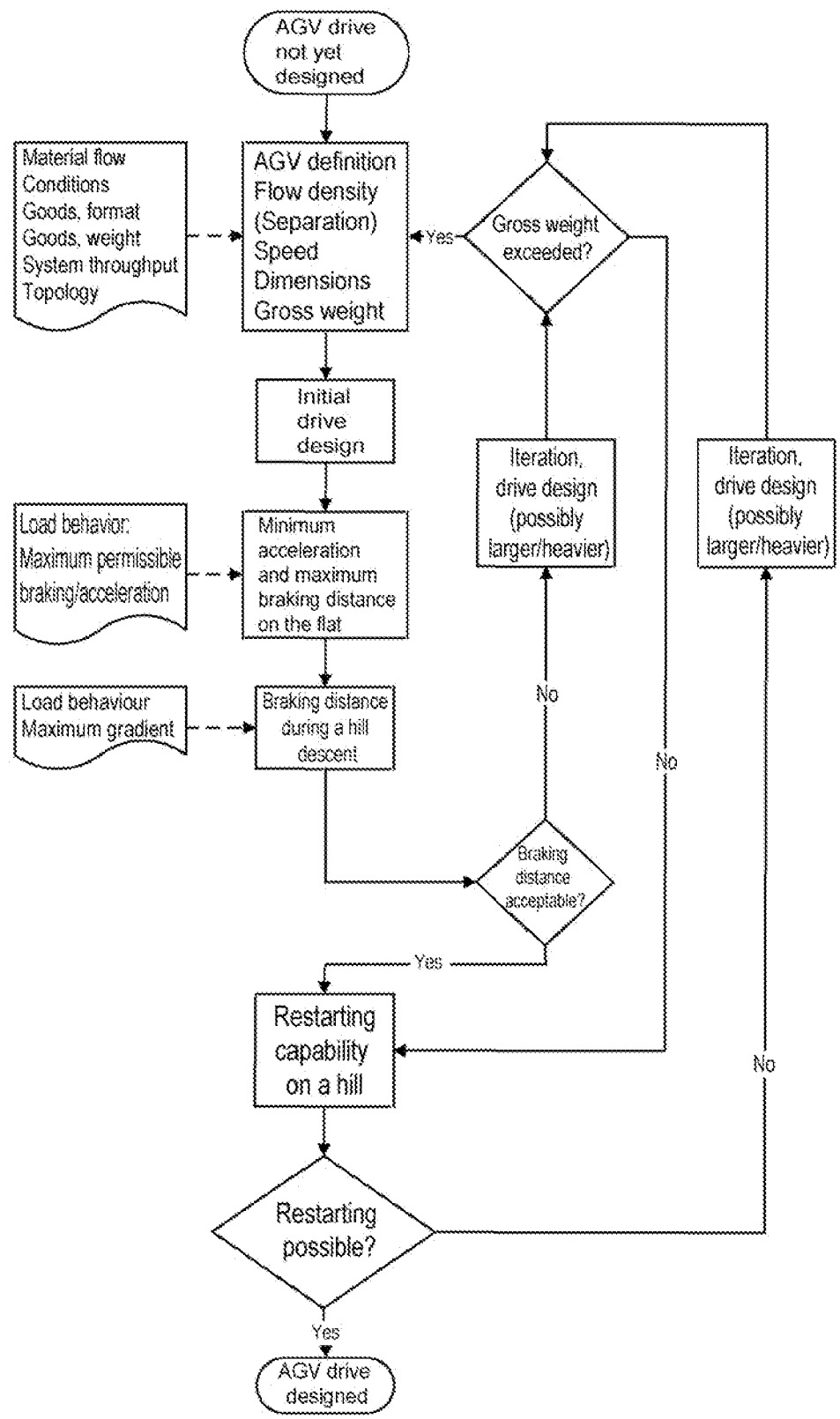
FIG. 5 shows a flow chart for dimensioning a drive for a DTV for movement on an inclined transport roadway.

FIG. 4 shows the motion sequence for the movement on an inclined transport roadway 1' with a change in the orientation of the DTV, the orientation of the DTV is specified with the axis of motion 14. The roadway width is in turn specified with the size B and the vehicle width with the size b. The edge of the roadway should not be understood to mean that a wall is present here, similarly to the situation on rural roads where guard railing or walls are not provided on the curb side. This lack of guard railing or walls is important in this embodiment of the invention when the driverless vehicle is rotating: During rotation, the corners of the vehicle 10 can also be located outside of the roadway strip of the roadway width B. A movement with a direction of motion angle β not equal to 90° is possible (not shown in FIG. 4) even with a motion sequence with a change in the orientation of a DTV.

Driverless transport systems DTS are internal, floor-bound conveyor systems with automatically controlled vehicles, the primary task of which is material transportation and not passenger transportation. DTSs consist essentially of the following components (as cited from [2]):

one or more driverless transport vehicles of a master control station;

facilities for determining location and recording position;

facilities for data transmission.

The DTSs are guided by a central controller and means are available both centrally and also resident in the vehicle for navigation purposes. Indeed, the topology of a transport roadway 1, 1' can be stored in the master control station, but provision is expediently made so that each DTS, which moves at right angles to the direction of inclination with the method described above, has means of detecting the direction of inclination d'. A homogeneous inclination with the constant angle of inclination α is shown in FIG. 1. Various angles of inclination α', α'', . . . may occur in reality. For what is known as the basic dimensioning of the drives of a DTS, a maximum permissible angle of inclination $α_{max}$ is set, which should be strictly retained when disposed in a sorter or transport installation. Here the afore-cited different angles of inclination α', α'' must satisfy the conditions $α' < α_{max}$ and $α'' < α_{max}$.

In addition, these vehicle-resident means, in other words position sensors, can also still detect the angle of inclination α. The detection of the direction of inclination d' is important to ensure that the steering drives 12 are brought into that position before or during movement, so that the DTS can move in a direction of motion angle β relative to the direction of inclination d'. The required precision of the detection of the direction of inclination d' is not ensured in any case with the master control station since that data is stored as system data and does not contain real-time data.

The present invention can also be used for the following exceptional case:

It is also not possible to prevent relatively small obstacles of a few centimetres from appearing spontaneously on a transport roadway 1. If a DTS is blocked by a small obstacle of this type and the normal movement in the transport direction d is prevented as a result, the local controller of a DTS can initiate the movement in a predetermined direction of motion angle β with respect to the transport direction d. By rotating the drive elements 12 about the direction of motion angle β relative to the transport direction d, it is possible to move around the obstacle in question.

A direction of motion angle β in the range of 90° to around 110° is therefore particularly advantageous because the gravitation assists the movement. Instead of a direction of motion angle β of 90° to around 110°, provision can also be made for a direction of motion angle β in the region of approx. −70° to −90°, by simultaneously setting a reversal of the drive wheels 12.

The synchronous movement of a plurality of DTSs can be configured as follows:

Since each DTS has means of detecting the direction of inclination d' of the transport roadway 1' relative to the transport vehicle 10 and thus also has means of detecting the angle of inclination α of the transport path 1', provision can be made for that DTS, which is located on a horizontal transport roadway, to move normally, in other words with a direction of motion angle β=0.

Due to temporary modifications in a driverless transport system, it may occur that the detected angle of inclination α is greater than the maximum permissible angle of inclination for the steering drives on account of the dimensioning of the power. To this end, the detected angle of inclination α is compared with the maximum permissible angle of inclination for the drive of the steering drives. If the detected angle of inclination α lies above the maximum permissible angle of inclination, after movement the steering drives 12 are activated so that the driverless vehicle continues to travel in a meander-type manner until the detected angle of inclination α lies below the maximum permissible angle of inclination.

LIST OF REFERENCE CHARACTERS, GLOSSARY

1 Transport route, transport roadway
1' inclined transport route, inclined transport roadway
10 driverless transport vehicle DTS
10', 10'', 10''', 10'''' successive positions of a DTS when moved in a gradient
11 piece goods
12 steering drive, driven wheel, drive element
13 supporting roller, rotatable supporting roller
14 axis of direction of the transport vehicle
15 axis of rotation of a steering drive or a supporting roller
16 wheel axis of a driven wheel 12 or a wheel 13
α gradient angle; angle of inclination
β direction of motion angle relative to the direction of inclination
B roadway width
b DTS width
d transport direction
d' transport direction in a gradient, direction of inclination
h height
s movement path when moved on a gradient
s'' movement path when moved on a gradient with a direction of motion angle β<90°
DTS driverless transport vehicle
DTS driverless transport system

LIST OF THE CITED DOCUMENTS AND REFERENCES

[1] AGV https://en.wikipedia.org/wiki/Automated guided vehicle
[2] DTS https://de.wikipedia.org/wiki/Fahrerloses Transportfahrzeug [Driverless transport vehicle]

[3] mobile robots https://en.wikipedia.org/wiki/Mobile robot

[4] Cross-belt sorter https://de.wikipedia.org/wiki/Quergurtsorter [Cross-belt sorter]

The invention claimed is:

1. A method for moving a driverless transport vehicle on a transport roadway, the method comprising:
providing the transport vehicle with a device for detecting a direction of inclination of the transport roadway relative to the transport vehicle and with controllable steering drives;
i) activating the steering drives on account of a detected direction of inclination to cause the transport vehicle to move in a direction which differs from the direction of inclination;
ii) once the transport vehicle reaches a predetermined minimum speed, adjusting the steering drives to cause the transport vehicle to continue to move in the direction of inclination.

2. The method according to claim 1, wherein the transport vehicle has a defined directional axis, and method steps i) and ii) comprise maintaining the directional axis parallel to the direction of inclination.

3. The method according to claim 1, wherein the transport vehicle has a defined directional axis, and prior to executing method step, rotating the transport vehicle about a direction of motion angle by way of the controllable steering drives, and method step ii) comprises causing the transport vehicle to continue to move in a direction of the directional axis.

4. The method according to claim 3, wherein method step i) comprises actuating the steering drives as virtual differential gears.

5. The method according to claim 1, wherein method step ii) comprises continuously repositioning the steering drives.

6. The method according to claim 1, which comprises providing each transport vehicle with a device for detecting an angle of inclination in addition to the direction of inclination of the transport roadway, in order to actuate the steering drives accordingly.

7. The method according to claim 6, wherein method step i) comprises defining a direction of motion angle relative to the direction of inclination, wherein the direction of motion angle lies in a range from 45° to 110°.

8. The method according to claim 7, which comprises comparing the detected angle of inclination with a maximum permissible angle of inclination for a drive of the steering drives and, if the detected angle of inclination lies above the maximum permissible angle of inclination in method step i), after movement activating the steering drives to cause the driverless vehicle to move in a meandering path until the detected angle of inclination lies below the maximum permissible angle of inclination.

9. The method according to claim 1, wherein method step i) comprises defining a direction of motion angle relative to the direction of inclination, wherein the direction of motion angle lies in a range from 45° to 110°.

10. The method according to claim 1, which comprises providing a plurality of driverless transport vehicles and synchronously moving the plurality of driverless transport vehicles along a transport roadway.

11. The method according to claim 1, which comprises moving the transport vehicle around an obstacle located on the transport roadway.

12. A transport system, comprising a plurality of driverless transport vehicles disposed on transport paths and configured for carrying out the method according to claim 1.

* * * * *